Patented Jan. 5, 1937

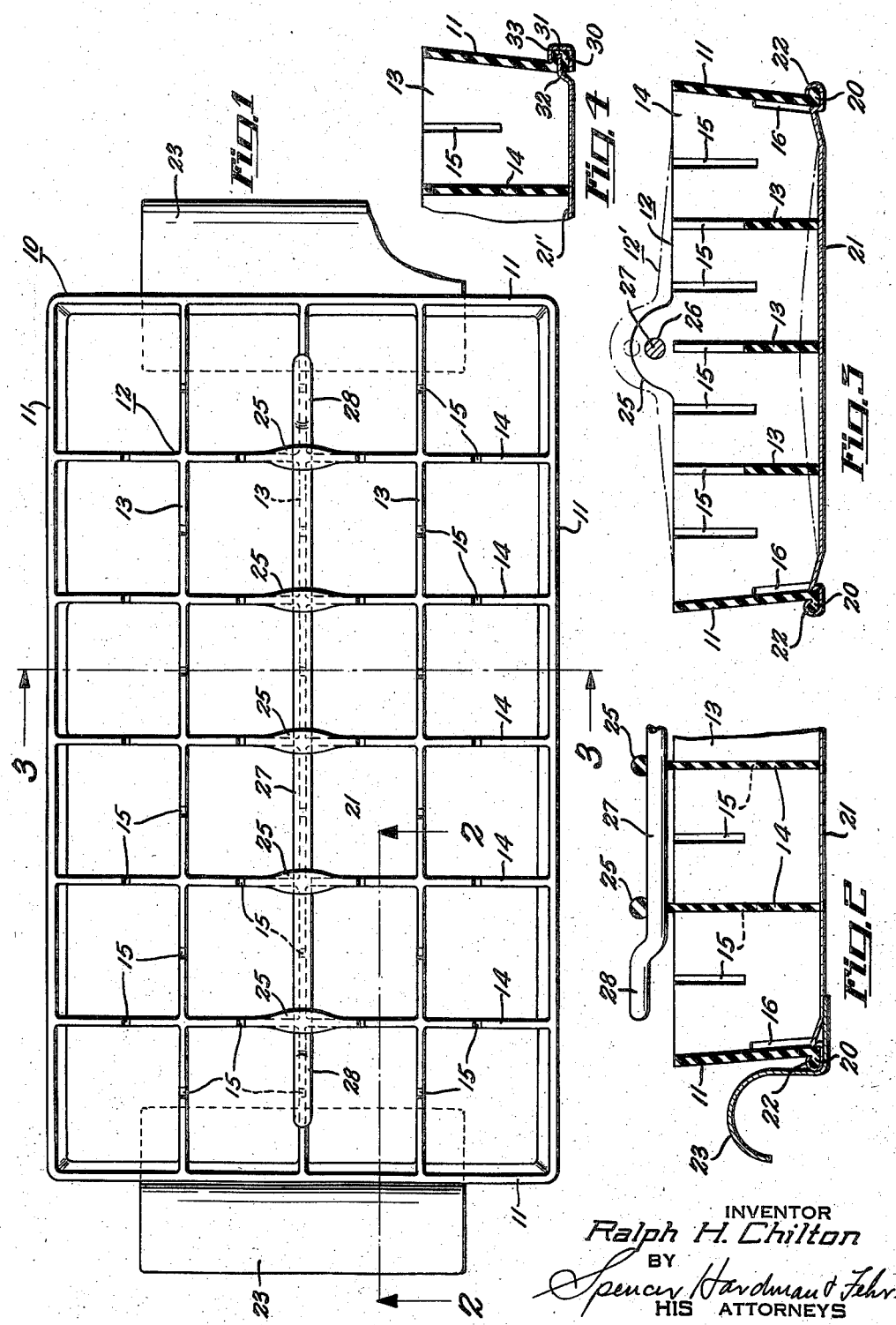

2,067,074

UNITED STATES PATENT OFFICE 2,067,074

FREEZING TRAY

Ralph H. Chilton, Dayton, Ohio, assignor to General Motors Corporation, Detroit, Mich., a corporation of Delaware Application February 26, 1934, Serial No. 712,885

6 Claims. (Cl. 62—108.5)

This invention relates to freezing trays adapted for use in the freezing compartment of domestic refrigerators.

An object of this invention is to provide a rapid freezing tray having integrally molded flexible rubber side walls and a sheet metal bottom attached to the lower edge of the rubber side walls by a permanent leak-proof joint. An important feature of this construction is the economy of manufacturing same. The bottomless rubber portion thereof may be simply molded without the necessity of putting any metal inserts, such as the metal bottom, in the molding dies whereby the cost of molding same is greatly reduced. The metal bottom is subsequently attached to the molded flexible rubber portion by any of the methods described herebelow to form a leak-proof container which will provide much more rapid freezing than a rubber bottom tray, since heat transfer takes place primarily through the bottom wall of the tray as ordinarily used.

Another object is to provide a freezing tray having an integrally molded upper portion comprising side walls and a partitioning grid and a flexible metal bottom wall attached to the lower edge of the side walls only, thus leaving the grid free from the metal bottom to facilitate manual flexing of the entire filled tray and the removal of the frozen contents.

Another object is to provide a freezing tray having a flexible rubber grid portion attached to the side walls and free from the bottom wall of the container portion, and means facilitating the manual grasping of the grid portion to pull it upwardly from the bottom wall to facilitate the removal of the frozen contents.

Further objects and advantages of the present invention will be apparent from the following description, reference being had to the accompanying drawing, wherein a preferred embodiment of the present invention is clearly shown.

In the drawing:

Fig. 1 is a plan view of a freezing tray made according to this invention.

Fig. 2 is a partial longitudinal section taken on line 2—2 of Fig. 1.

Fig. 3 is a transverse section taken on line 3—3 of Fig. 1.

Fig. 4 shows a modified form wherein a separate metal clamping member compresses the rubber into tight contact with the edges of the metal bottom to form a permanent leak-proof joint.

Similar reference characters refer to similar parts throughout the several views.

In the form shown in Figs. 1, 2, and 3, an integrally molded flexible rubber portion 10 comprises the outer side walls 11 and the grid portion 12. Grid 12 comprises the longitudinal partitions 13 and transverse partitions 14 which are integrally molded at their intersections. Preferably the grid partitions have a series of slots 15 therein extending part way down from the upper edges thereof to provide for easier distortibility of the grid to facilitate removal of the frozen contents from the pockets. Also the partitions 13 and 14 where they adjoin the side walls 11 are preferably provided with slots 16 extending part way up from the bottom edges thereof, as clearly shown in Fig. 3. These slots 16 obviously permit the grid portion 12 as a whole to be more easily flexed upwardly relative to the side walls 11, as shown in dot dash lines 12' in Fig. 3. Slots 15 and 16 may both be easily molded in the rubber partitions 13 and 14 since the rubber portion 10 is molded without any bottom wall and hence the die parts which form the slots 16 may be readily withdrawn downwardly from the molded article when it is removed from the vulcanizing die.

The side walls 11 are molded with a laterally projecting flange or bead 20 which extends all the way around the tray and provides a suitable means for attaching the metal bottom 21 to the rubber walls 11 by crimping the metal around the bead 20.

The metal bottom 21, preferably made of flexible sheet metal, is first cut to shape and has the edge beads 22 partially formed therein by a suitable die. The molded rubber portion 10 is then set thereupon so that the rubber beads 20 lie snugly within the partially formed metal beads 22. The rolled edges of the metal bottom are then bent down firmly into the resilient rubber forming the sheet metal beads 22 tightly encasing the rubber beads 20 to form a leak-proof joint. Suitable metal handles 23 may be attached to the metal bottom 21 by welding or by any other suitable means. In the tray thus made, the rubber partitions 13 and 14 are supported upon the metal bottom 21 but are not attached thereto and hence may be readily pulled upwardly by hand to facilitate the removal of the frozen ice blocks.

To facilitate such upward pulling of the loose grid 12, there is preferably provided a series of integral tabs 25 on the partitions 14, said tabs having aligned central holes 26 through which the removable metal rod 27 may be readily inserted or removed at will. By grasping one or both of the upwardly turned ends 28 of rod 27 by the hands the rubber grid 12 may be easily lifted upwardly from the metal bottom to a position considerably higher than that shown by the dot and dash lines 12' in Fig. 3.

In operation the tray is filled with water or other liquid to be frozen and set within the freezing compartment, preferably upon a refrigerated metal support. Freezing takes place rapidly due to the metal bottom being a good heat conductor. If the tray freezes to its metal support due to water on its outside, it may be readily freed therefrom by flexing the metal bottom progressively from end to end by lifting up on one end thereof.

After removal from the refrigerator, the entire tray may be slightly flexed or twisted to break the frozen bond between the ice and the metal bottom 21. Such initial flexing or twisting is greatly facilitated by having the partitions 13 and 14 not attached to the metal bottom, and hence during such initial flexing the metal bottom 21 may be peeled, so to speak, from the entire area of the ice block just as if there were no partitions present. After the ice is loosened from the metal bottom, the central portion of the grid 12 may be readily raised as described above by lifting up on the rod 27, preferably at one end 28 thereof at a time to more easily break the bond between the ice blocks and the rubber partitions. Or, if desired, the rod 27 may be removed by pulling it endwise from the apertures in the tabs 25 and small portions of grid 12 raised at a time by grasping the tabs 25 with the fingers. Due to the flexibility of the side walls 11 and the slots 15 and 16 the grid 12 may be lifted sufficiently high to so expand the ice pockets as to permit the ice blocks to be picked out with the fingers one at a time, or to permit the entire contents to be dumped out by inverting the tray. The rod 27 lies directly above the central partition 13 and is not so wide as to interfere with the removal of the ice blocks adjacent thereto since these ice pockets are materially expanded toward their upper portions when rod 27 is lifted up as described above.

Fig. 4 illustrates a modification wherein the rubber side walls 11 are molded with an enlarged peripheral bead 30 having an inwardly opening slit 31 therein into which the peripheral edge 32 of the metal bottom 21' is subsequently inserted. A separate metal clamping ring 33 is slipped upon the rubber bead 30 and crimped thereupon to highly compress the rubber upon the metal edge 32 and so form a leak-proof joint. In this form the flexibility of the metal bottom is not reduced by any stiffening bead formed upon its marginal edges.

While the embodiment of the present invention as herein disclosed, constitutes a preferred form, it is to be understood that other forms might be adopted, all coming within the scope of the claims which follow.

What is claimed is as follows:

1. A freezing tray comprising: a bottomless flexible rubber grid and side walls attached thereto, and a flexible sheet metal bottom attached to the lower edge of said side walls by a leak-proof joint, the lower edges of the grid walls normally resting upon said metal bottom but adapted to be pulled upwardly therefrom by distortion of the rubber walls.

2. A freezing tray comprising: a bottomless flexible rubber grid portion and an integrally molded flexible rubber peripheral side wall having an integral flange on its lower edge, and a flexible metal bottom attached to said lower rubber flange to form a leak-proof joint therebetween, the lower elges of the grid portion being free from said metal bottom.

3. A freezing tray comprising: a flexible rubber partitioning portion and an integrally molded flexible rubber peripheral side wall having an integral flange on its lower edge, and a flexible metal bottom having its edges deformed to snugly engage said lower rubber flange and forming a leak-proof joint therewith, the lower edges of the partitioning portion being free from said metal bottom.

4. A freezing tray comprising: a flexible non-metallic partitioning portion and an integral flexible non-metallic peripheral side wall having an inwardly-opening substantially-horizontal groove in its lower edge extending around the periphery of the tray, and a substantially flat metal bottom having a raised marginal edge inserted snugly within said peripheral groove and a separate metal clamping member compressing the groove walls into tight contact with the marginal edge of said metal bottom and forming a leak-proof joint.

5. A freezing tray comprising: a water container having flexible rubber side walls, a bottom wall, and a bottomless flexible rubber grid attached to said side walls, the lower edges of said grid normally lying adjacent to but being free and separatable from the bottom wall of said container.

6. A freezing tray comprising: a water container having flexible rubber side walls, a metal bottom wall, and a flexible rubber partition member attached to the side walls of said container, but being free from the bottom wall of said container, and means for grasping said flexible partition member to deflect it upwardly from said metal bottom wall to facilitate the removal of the frozen contents.

RALPH H. CHILTON.